United States Patent
Corry et al.

(10) Patent No.: US 8,234,655 B2
(45) Date of Patent: Jul. 31, 2012

(54) DETECTION OF DUPLICATE MEMORY PAGES ACROSS GUEST OPERATING SYSTEMS ON A SHARED HOST

(75) Inventors: Kevin Michael Corry, Pflugerville, TX (US); Mark Alan Peloquin, Austin, TX (US); Steven L. Pratt, Leander, TX (US); Karl Milton Rister, Austin, TX (US); Andrew Matthew Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 12/181,674

(22) Filed: Jul. 29, 2008

(65) Prior Publication Data
US 2010/0031271 A1    Feb. 4, 2010

(51) Int. Cl.
G06F 3/00 (2006.01)
G06F 9/44 (2006.01)
G06F 9/46 (2006.01)
G06F 13/00 (2006.01)

(52) U.S. Cl. ........................ 719/312; 711/148
(58) Field of Classification Search .................. 711/148; 719/312
See application file for complete search history.

(56) References Cited

U.S. PATENT DOCUMENTS

| | | | |
|---|---|---|---|
| 6,789,156 B1 * | 9/2004 | Waldspurger | ...................... 711/6 |
| 6,889,297 B2 | 5/2005 | Krapp et al. | |
| 7,275,028 B2 | 9/2007 | Traut | |
| 7,500,048 B1 * | 3/2009 | Venkitachalam et al. | ........ 711/6 |
| 7,660,819 B1 * | 2/2010 | Frieder et al. | .......... 707/999.107 |
| 7,925,850 B1 * | 4/2011 | Waldspurger et al. | ........ 711/162 |
| 2004/0098544 A1 * | 5/2004 | Gaither et al. | ................. 711/154 |
| 2005/0160151 A1 | 7/2005 | Rawson | |
| 2006/0259732 A1 | 11/2006 | Traut et al. | |
| 2007/0016904 A1 | 1/2007 | Adlung et al. | |
| 2008/0222366 A1 * | 9/2008 | Hieda | ........................... 711/148 |

OTHER PUBLICATIONS

Kloster et al., On the Feasibility of Memory Sharing in Virtualized Systems, Aalborg University, Feb. 2007, pp. 1-10.*
Windows Server "Longhorn" Beta 3 Technical Overview, http://download.microsoft.com/download/9/b/8/9b8a5780-01f5-4482-ae78-c02f46c572cf/Longhorn_Beta3%20_Technical_Overview.doc, Apr. 24, 2007; Microsoft corporation.
Morejon, Mario, Bake-off: 4 Virtualization Suites (In One Review!), http://www.crn.com/article/printableArticle.jhtml?articleId=201400070, Aug. 13, 2007, ChannelWeb.

* cited by examiner

*Primary Examiner* — Diem Cao
(74) *Attorney, Agent, or Firm* — VanLeeuwen & VanLeeuwen; Steven L. Bennett

(57) ABSTRACT

A hypervisor receives a memory page checksum from a guest operating system, which corresponds to a page of memory utilized by the guest. Next, the hypervisor proceeds through a series of steps to detect that the memory page checksum matches a checksum value included in a checksum entry item, which includes an identifier of a different guest. In turn, the hypervisor shares the page of memory between the guest and the different guest in response to detecting that the memory page checksum matches the checksum value included the checksum entry item.

17 Claims, 8 Drawing Sheets

| CHECKSUM VALUE | LOCK | TUPLES (Guest_ID, Page Number, Shared (Y/N)) | | | |
|---|---|---|---|---|---|
| 47928374 | NO | 4EF87, 24, N | 5978DE, 142, N | ........ | 10943G, 745, N |
| 2234883 | YES | 7GFH4, 3634, Y | 97898F, 4269, Y | ........ | 787GFD, 8543, Y |
| . . . | . . . | . . . | . . . | ........ | . . . |
| 09088402 | NO | 4EF87, 24, N | | | |

FIG. 4

DETECTION OF DUPLICATE MEMORY PAGES ACROSS GUEST OPERATING SYSTEMS ON A SHARED HOST

BACKGROUND OF THE INVENTION

1. Technical Field

The present invention relates to improving duplicate memory page detection across multiple guest operating systems. More particularly, the present invention relates to using memory page checksum values that are generated and received from the guest operating systems to detect duplicate memory page utilization amongst the guest operating systems.

2. Description of the Related Art

A computer system may utilize a hypervisor for allowing multiple operating systems to concurrently run on a host computer. Some hypervisors attempt to share duplicate memory pages from different guest operating systems in an effort to reduce the amount of memory needed to host each of the guests on one system. The invention described herein pertains to improving the detection of multiple guest operating systems utilizing duplicate memory pages.

SUMMARY

A hypervisor receives a memory page checksum from a guest operating system, which corresponds to a page of memory utilized by the guest. Next, the hypervisor proceeds through a series of steps to detect that the memory page checksum matches a checksum value included in a checksum entry item, which includes an identifier of a different guest. In turn, the hypervisor shares the page of memory between the guest and the different guest in response to detecting that the memory page checksum matches the checksum value included the checksum entry item.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 4 is a diagram showing a repository of checksum entry items in which a hypervisor manages;

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
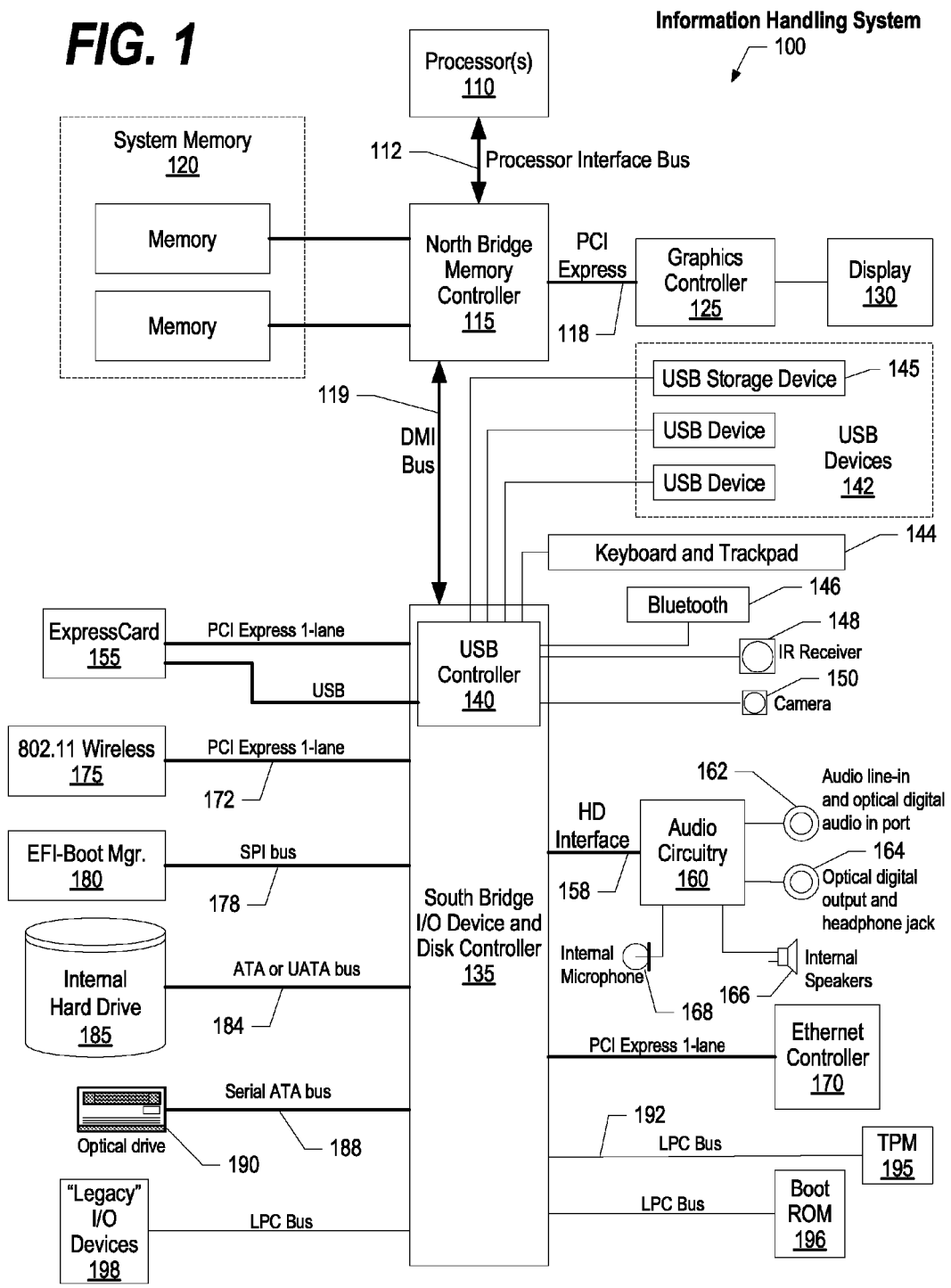
FIG. 1 is a block diagram of a data processing system in which the methods described herein can be implemented.
Figure 2:
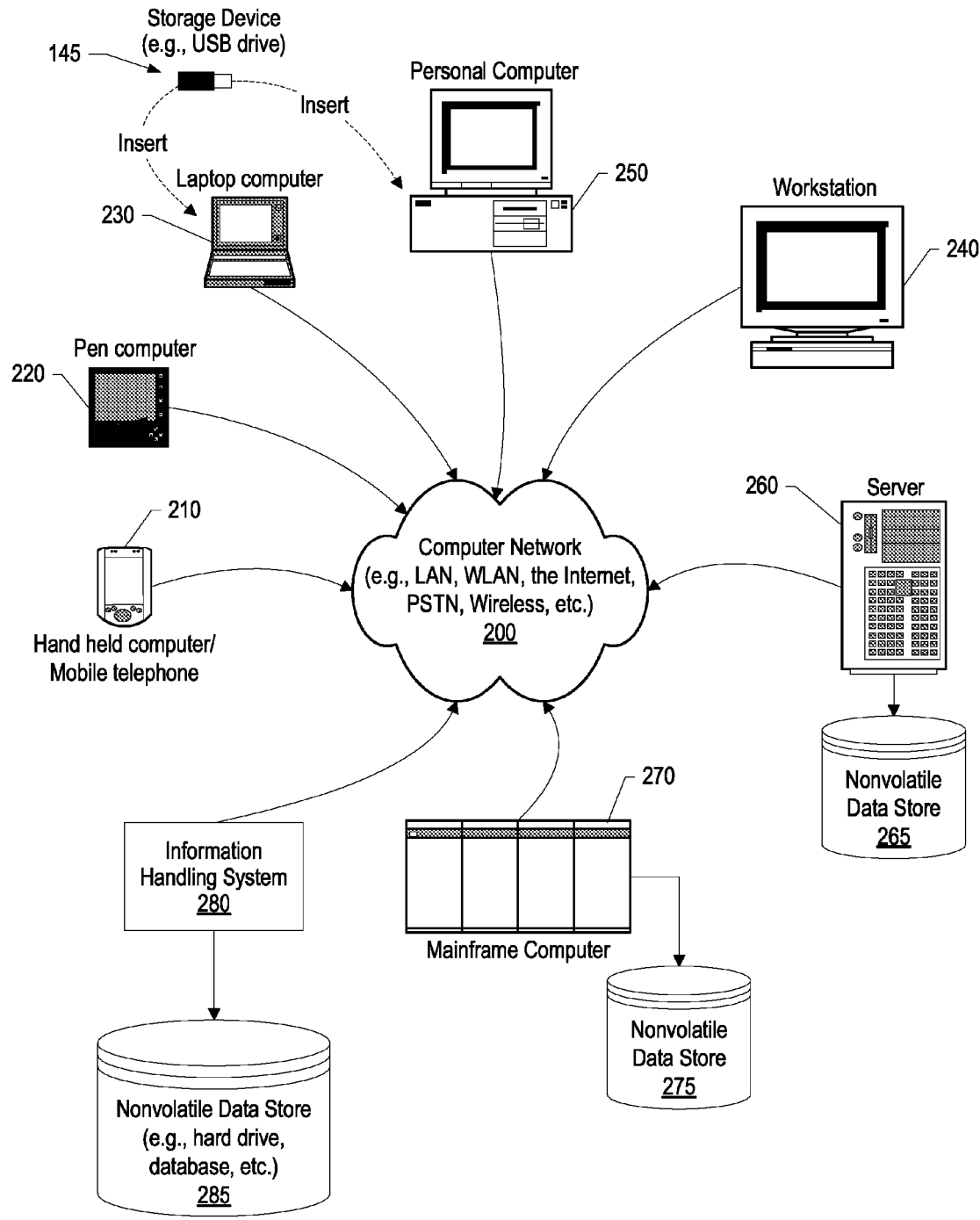
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
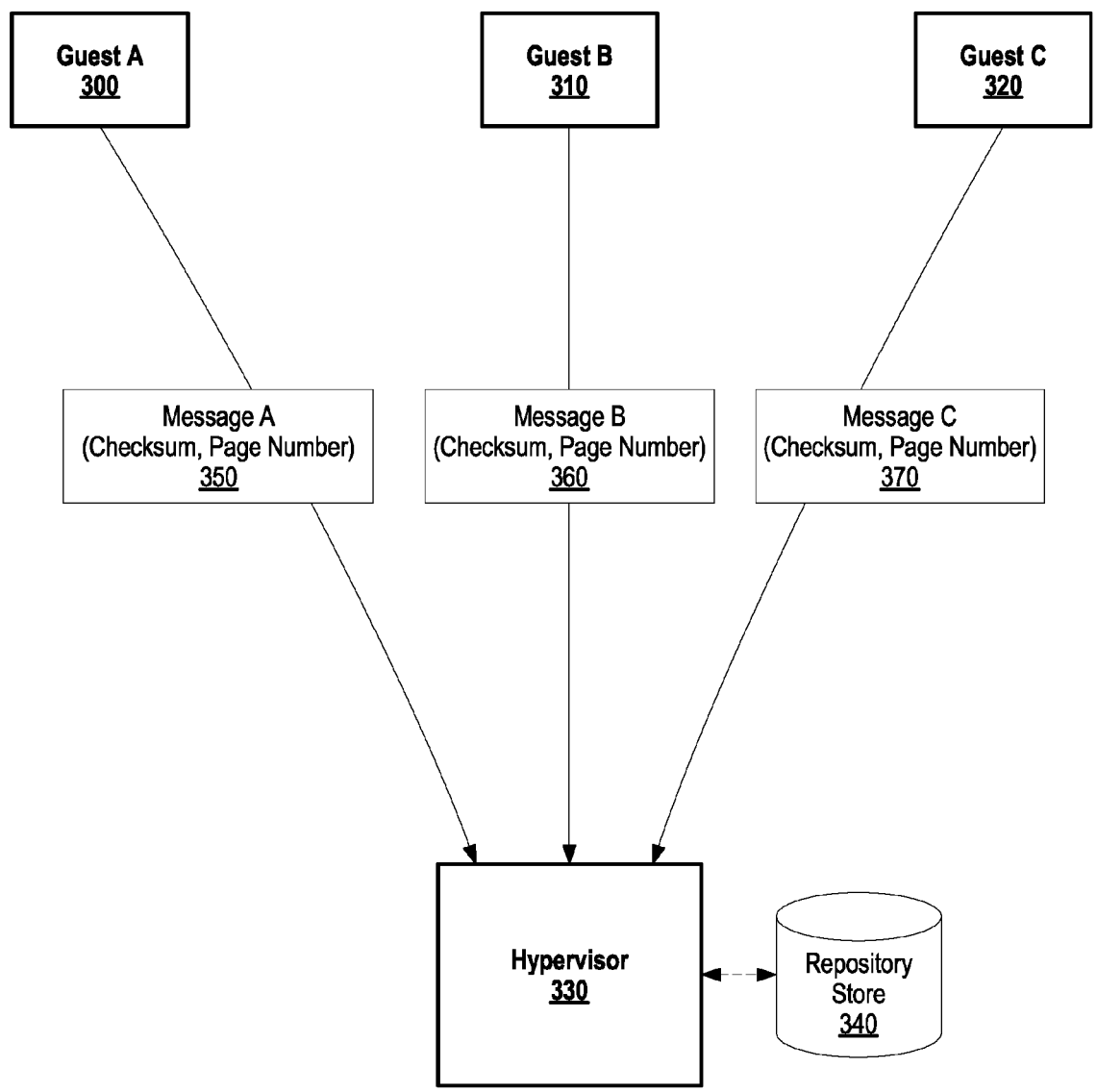
FIG. 3 is a diagram showing a hypervisor utilizing memory page checksums, which are computed by guest operating systems, for detecting duplicate pages of memory across the guest operating systems.

FIG. 3 is a diagram showing a hypervisor utilizing memory page checksums, which are computed by guest operating systems, for detecting duplicate pages of memory across the guest operating systems. Hypervisor 330 manages checksum entry items included in repository store 340 that track pages of memory that are utilized by guest A 300, guest B 310, and guest C 320. Each checksum entry includes a checksum value, a checksum entry lock, and a "tuple" for each guest that provides a memory page checksum equaling the checksum value.

Each tuple includes a guest identifier (identifies guest A 300, guest B 310, or guest C 320), a page number, and a shared page indicator (see FIG. 4 and corresponding text for further details). In other words, hypervisor 330 uses memory page checksums sent from guests A 300, B 310, and C 320 as a first indication of duplicate page utilization across guests A 300, B 310, and C 320. As a result, instead of hypervisor 330 wasting resources for computing checksums of memory pages, each guest has the responsibility of scanning memory pages and computing their corresponding checksums.

Guest A 300 loads a page of memory and computes a memory page checksum for the page of memory. For example, an application may be executing within guest A 300, which loads a document or spreadsheet. Next, guest A 300 generates message A 350, which includes the memory page checksum and a page number of the page of memory (e.g., address), and sends message A 350 to hypervisor 330. Hypervisor 330 extracts the memory page checksum and checks whether a checksum entry item included in repository store 340 already includes a checksum value that matches the received memory page checksum. If a checksum entry item exists, hypervisor 330 generates a tuple for guest A 300 and includes the tuple in the checksum entry item. If a checksum entry does not exist, hypervisor 330 creates a new checksum entry item and includes the tuple in the new checksum entry item. In either case, the generated tuple includes a guest identifier that identifies guest A 300, a page number corresponding to guest A 300's loaded page, and a shared page indicator that is initially set to "No," indicating that guest A 300 does not initially share the page of memory with another guest operating system.

Likewise, guest B 310 and guest C 320 load pages of memory and generate message B 360 and message C 370, respectively. Hypervisor 330 receives the messages and determines whether to add a tuple to one of the existing checksum entry items or create a new tuple. When the hypervisor detects that more than one guest is utilizing the same page of memory, hypervisor proceeds through a series of steps to share the page of memory between the guests (see FIG. 7 and corresponding text for further details).

FIG. 4 is a diagram showing a repository of checksum entry items in which a hypervisor manages. Repository 400 includes checksum entry items 440 through 460. Each of checksum entry items 440 through 460 includes a different checksum value, which is shown in column 410. Column 420 shows a checksum entry lock status of each of the checksum entry items. As can be seen, checksum entry item 450 is currently locked, which indicates that the hypervisor is proceeding through a series of steps to share a memory page between guest operating systems (see FIG. 7 and corresponding text for further details).

Each of checksums 440 through 460 include one or more tuples (shown in columns 430). Each tuple includes a guest identifier, a page number, and a shared page indicator. The guest identifier identifies a guest that sent a message to the hypervisor that included a memory page checksum equaling the checksum value. Meaning, if a particular checksum entry item includes three tuples, then three guest operating systems may be utilizing the same page of memory. A tuple's page number corresponds to the particular memory location of the page of data utilized by the particular tuple's guest operating system. And, the shared page indicator indicates whether the page of data is currently shared by the tuple's guest operating system. For example, checksum entry item 450 includes three tuples. Each of the tuples has a shared page indicator of "Y," which indicates that a page of data with a checksum value of "2234883" is being shared across guests with corresponding guest identifiers of "7GFH4," "97898F," and "787GFD."

Using checksum entry item 440 as another example, each tuple has a shared page indicator of "N," which indicates that three guests may be utilizing duplicate pages of data, but the page of data is not yet shared between the guest operating systems. The hypervisor subsequently proceeds through a series of steps in order to ensure that the pages of memory include the exact same data before sharing the page of memory between the three guest operating systems (see FIG. 7 and corresponding text for further details).

Figure 5:
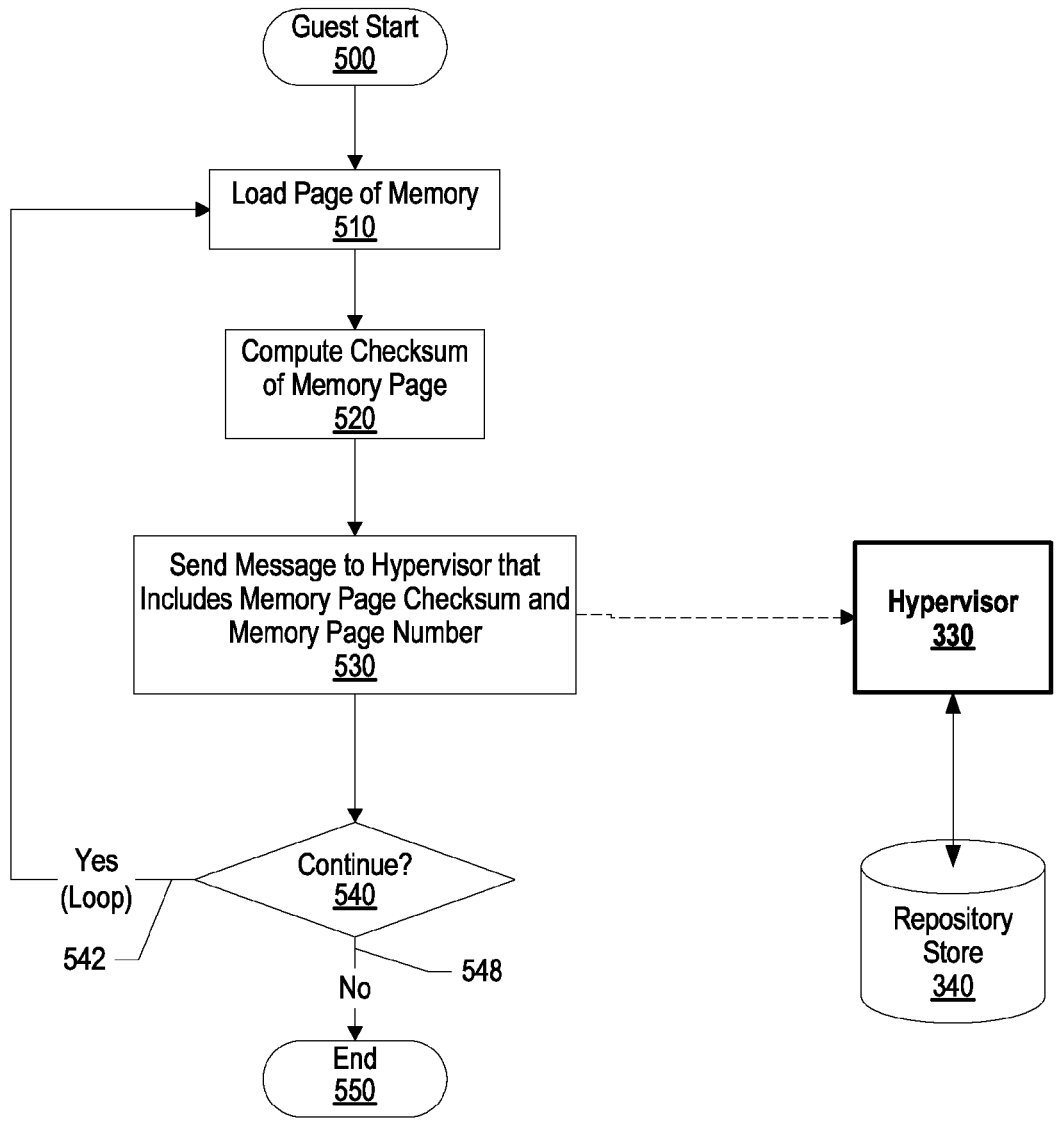
FIG. 5 is a flowchart showing steps taken in a guest operating system computing a memory page checksum and sending the memory page checksum to a hypervisor.

FIG. 5 is a flowchart showing steps taken in a guest operating system computing a memory page checksum and sending the memory page checksum to a hypervisor. Guest processing commences at 500, whereupon the guest loads a page of memory in which the guest utilizes (step 510). For example, the guest may load a document for the guest's user to view.

At step 520, the guest computes a memory page checksum of the loaded page of memory and, at step 530, the guest sends a message to hypervisor 330 that includes the memory page checksum and a page number that identifies the loaded page of memory. In turn, hypervisor 330 stores a tuple in repository store 340 that includes a guest identifier, a page number, and a shared page indicator (see FIG. 4 and corresponding text for further details). As a result, instead of hypervisor 330 wasting resources for computing checksums of memory pages, each guest has the responsibility of scanning memory pages and computing their corresponding checksums.

A determination is made as to whether to continue guest processing (decision 540). If guest processing should continue, decision 540 branches to "No" branch 542 whereupon processing loops back to load more pages of memory and send corresponding memory page checksums to hypervisor 330. This looping continues until guest processing should terminate, at which point decision 540 branches to "No" branch 548 whereupon processing ends at 550.

Figure 6:
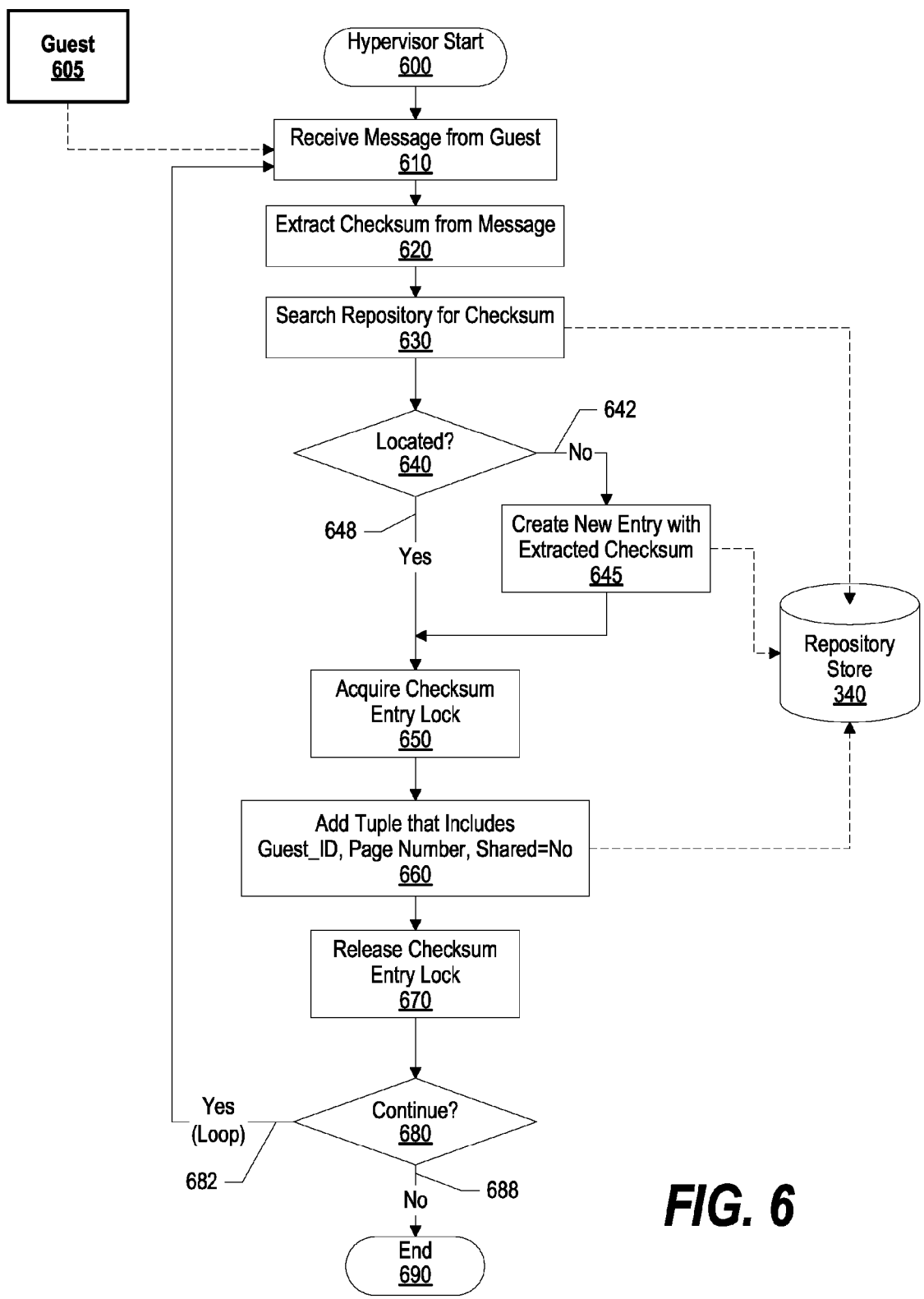
FIG. 6 is a flowchart showing steps taken in a hypervisor receiving memory page checksums and adding tuples to checksum entries in order to subsequently detect duplicate memory page utilization across multiple guest operating systems.

FIG. 6 is a flowchart showing steps taken in a hypervisor receiving memory page checksums and adding tuples to checksum entries in order to subsequently detect duplicate memory page utilization across multiple guest operating systems.

Hypervisor processing commences at 600, whereupon processing receives a message from guest 605 at step 610. The message includes a memory page checksum and a page number corresponding to a page of memory that is utilized by guest 605. At step 620, processing extracts the memory page checksum from the message and, at step 630, processing searches repository store 340 to determine whether a checksum entry item exists that includes a checksum value that matches the extracted memory page checksum. Repository store 340 is the same as that shown in FIG. 3.

A determination is made as to whether repository store 340 includes a checksum entry item that includes a checksum value that matches the extracted memory page checksum (decision 640). If a matching checksum entry item does not exist, decision 640 branches to "No" branch 642 whereupon processing creates a new checksum entry item in repository store 340 (step 645). The new checksum entry item includes a checksum value that equals the extracted memory page checksum and a checksum entry lock indicator. On the other hand, if a matching checksum entry item exists, processing branches to "Yes" branch 648, bypassing the new checksum entry item creation step.

At step 650, processing acquires a checksum entry lock. At this point, processing acquires the lock for either the matching checksum entry item or the new checksum entry item (based upon decision 640). Processing, at step 660, adds a tuple to the checksum entry item. The tuple includes 1) a guest identifier that identifies guest 605; 2) a page number that identifies the location of the page of memory utilized by guest 605; and 3) a shared page indicator that originally indicates that the page of memory is not shared. Once processing adds the tuple, processing releases the checksum entry lock at step 670.

A determination is made as to whether hypervisor processing should continue (decision 680). If processing should continue, decision 680 branches to "Yes" branch 682, which loops back to receive and process more messages. This looping continues until processing should terminate, at which point decision 680 branches to "No" branch 688 whereupon hypervisor processing ends at 690.

Figure 7:
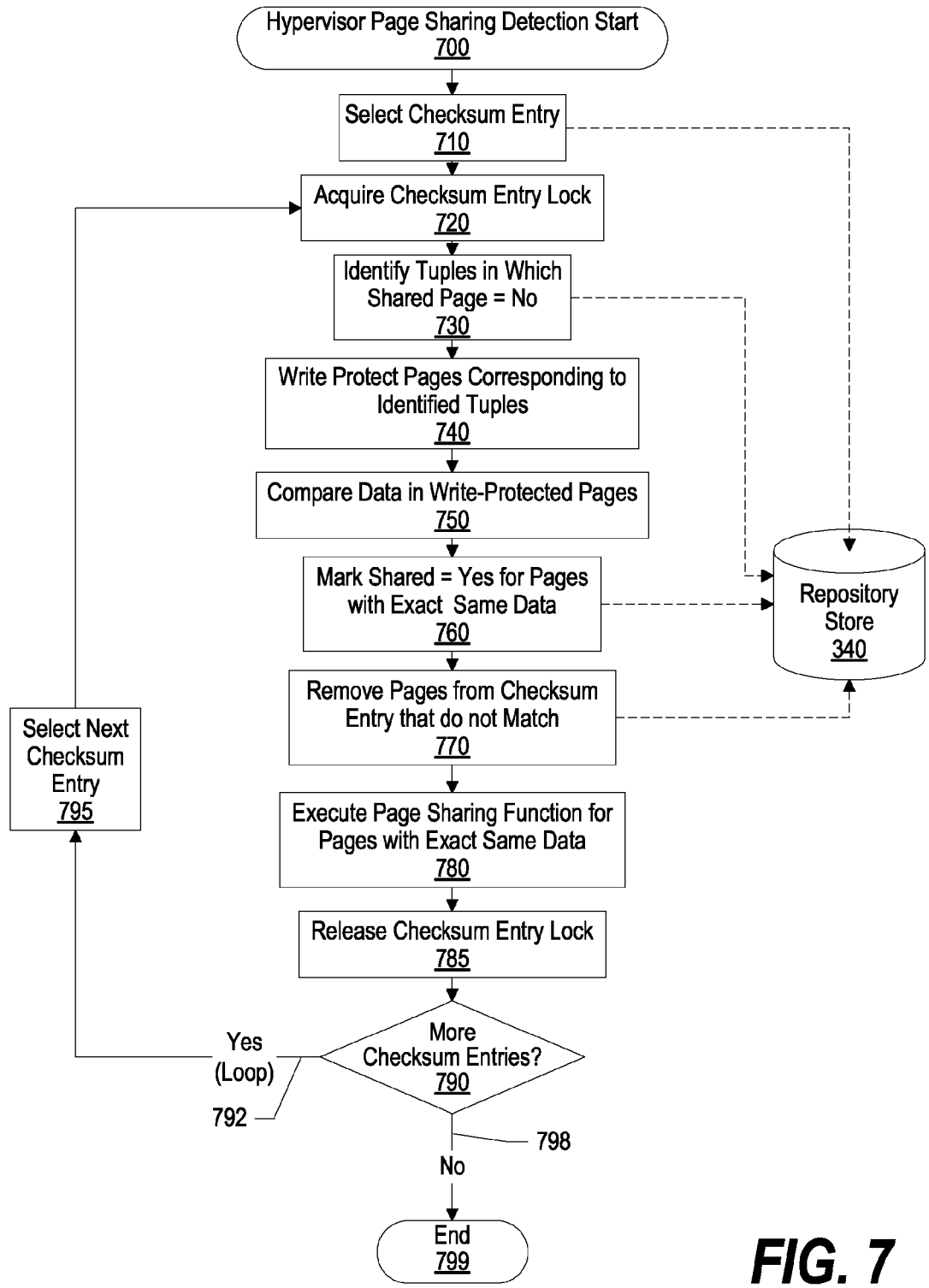
FIG. 7 is a flowchart showing steps taken in a hypervisor detecting duplicate pages of memory across guest operating systems and sharing the pages of memory between the guest operating systems.

FIG. 7 is a flowchart showing steps taken in a hypervisor detecting duplicate pages of memory across guest operating systems and sharing the pages of memory between the guest operating systems. Processing commences at 700, whereupon processing selects a checksum entry item located in repository store 340. The checksum entry item includes a checksum value, a checksum entry lock, and one or more tuples (see FIG. 4 and corresponding text for further details). Repository store 340 is the same as that shown in FIG. 3.

At step 720, processing acquires the checksum entry lock and, at step 730, processing identifies tuples that include a shared page indicator that indicate their corresponding page of memory is currently not shared. For example, the hypervisor may have created a tuple based upon recently receiving a memory page checksum from a guest and, in this example, the hypervisor has not yet shared the page of memory with other guests.

Processing, at step 740, write protects those pages of memory that correspond to the identified tuples. For example, a tuple may include "Page Number=85F43" and "Shared Page Indicator=No." In this example, processing write protects the page of memory located at "85F43." Processing then compares the data included in the write protected pages in order to guarantee that the pages of memory are identical (step 750). In one embodiment, this step may be performed based upon the status of the tuples included in the checksum entry item. For example, if there exists any tuples in the checksum entry item that include "Shared Page Indicator=Yes," processing compare the pages from tuples that have "Shared Page Indicator=No" to the page of the first tuple with "Shared Page Indicator=Yes." Continuing with this example, if there are no tuples present in the checksum entry item that have "Shared Page Indicator=Yes," processing compares the page of memory corresponding to the first tuple to pages of memory corresponding to the other tuples.

After comparing the data, processing sets the shared page indicator to "Yes" for tuples whose corresponding page of memory includes the exact same data (step 760). Processing also removes those tuples from the checksum entry item whose pages of memory do not match (step 770). At step 780, processing executes a page sharing function to share the page of memory between guests that are utilizing pages of memory that include the exact same data, which was identified at step 750. For example, processing may execute a page sharing function that selects one of the guest's pages as a master page and maps the other guests' page numbers to point to the physical location of the master page. At step 785, processing releases the checksum entry lock.

A determination is made as to whether there are more checksum entry items to process (decision 790). If there are more checksum entry items to process, decision 790 branches to "Yes" branch 792, which loops back to select (step 795) and process the next checksum entry item. This looping continues until there are no more checksum entry items to process, at which point decision 790 branches to "No" branch 798 whereupon processing ends at 799.

Figure 8:
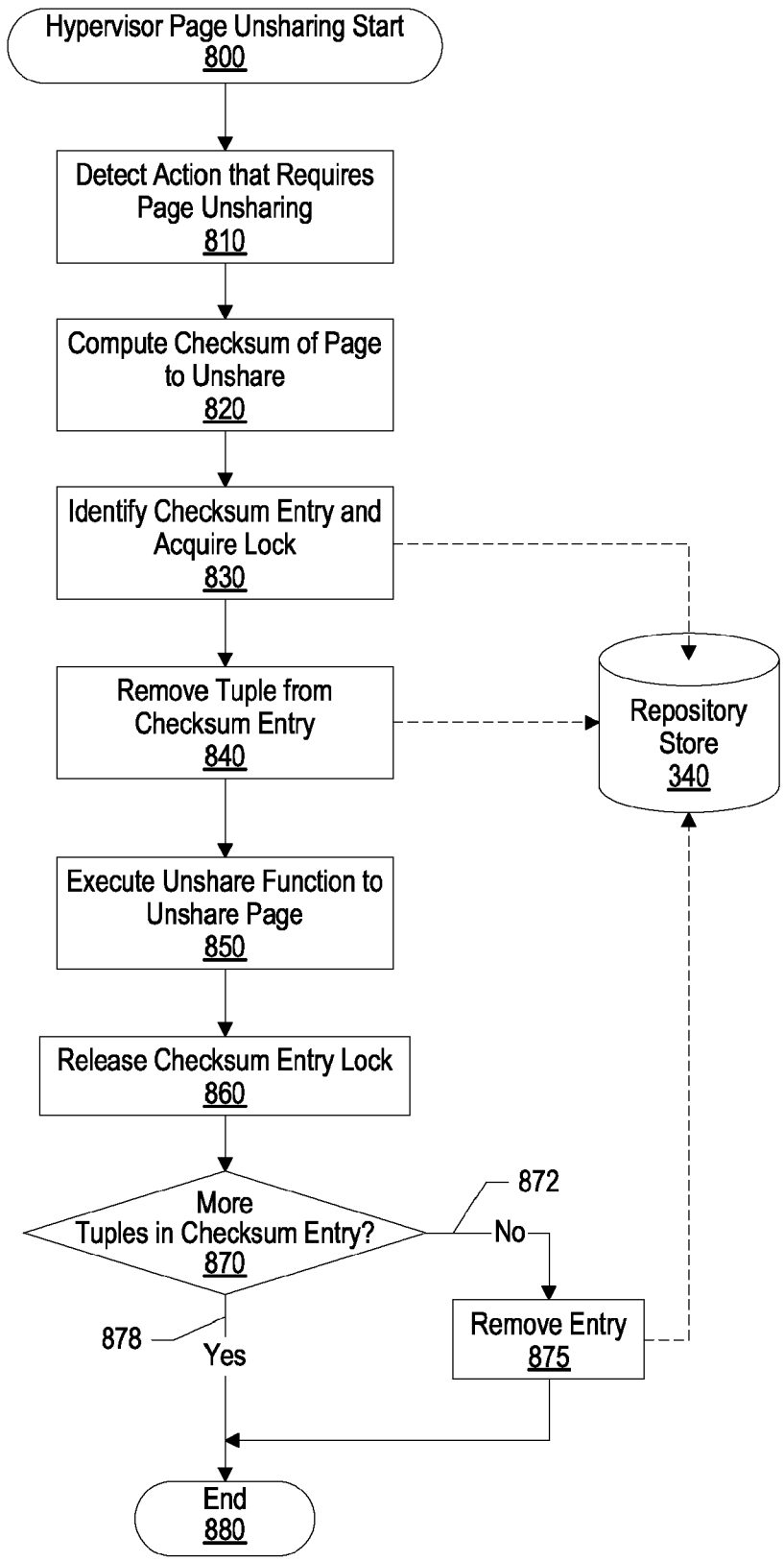
FIG. 8 is a flowchart showing steps taken in a hypervisor unsharing a page of memory between guest operating systems.

FIG. 8 is a flowchart showing steps taken in a hypervisor unsharing a page of memory between guest operating systems. Processing commences at 800, whereupon processing detects an action by a guest operating system that requires a page of memory to be unshared (step 810). For example, a guest may invoke a write request to the page of memory.

At step 820, processing computes a memory page checksum of the page of memory in which to unshare and, at step 830, processing identifies a checksum entry item located in repository store 340 that corresponds to the computed memory page checksum, and requires a checksum entry lock for the identified checksum entry item. At step 840, processing removes a tuple from the checksum entry item that corresponds to the guest that invoked the action that was detected at step 810.

At step 850, processing executes an unsharing function in order to unshare the page between the guest and other guests. For example, processing may provide a new, unused memory page to a guest attempting to modify the shared page, copy the contents of the shared page to the new page, update the guest page mapping such that the mapping for this page number points to the physical location of the new page, and allow the guest to modify the new page. Processing releases the checksum entry lock at step 860. Repository store 340 is the same as that shown in FIG. 3.

A determination is made as to whether more tuples exist in the checksum entry item (decision 870). For example, if a single tuple existed in the checksum entry item and the single tuple was removed at step 840, the checksum entry item does not include any more tuples. If the checksum entry item does not include any more tuples, decision 870 branches to "No" branch 872 whereupon processing removes the checksum entry item from repository store 340 (step 875). On the other hand, if the checksum entry item still includes one or more tuples, decision 870 branches to "Yes" branch 878 bypassing the checksum entry item removal step. Processing ends at 880.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   receiving a memory page checksum from a guest, wherein the memory page checksum corresponds to a page of memory utilized by the guest;
   detecting that the memory page checksum matches a checksum value included in a checksum entry item, wherein the checksum entry item includes an identifier of a different guest; and
   in response to detecting that the memory page checksum matches the checksum value included the checksum entry item, sharing the page of memory between the guest and the different guest, wherein the sharing further comprises:
     adding a tuple to the checksum entry item that corresponds to the guest, wherein the tuple includes a shared page indicator that indicates the page of memory is not shared;
     determining that data in the page of memory matches different data in a different page of memory corresponding to the different guest;
     in response to determining that the data matches the different data, changing the shared page indicator to indicate the page of memory is shared; and
     executing a page sharing function that shares the page of memory between the guest and the different guest.

2. The method of claim 1 wherein, prior to receiving the memory page checksum from the guest, the method further comprises:
   loading the page of memory by the guest, wherein the guest is a guest operating system and the different guest is a different guest operating system;
   in response to loading the page of memory, computing, by the guest, the memory page checksum that corresponds to the loaded page of memory; and
   sending the memory page checksum to a hypervisor, wherein the hypervisor performs the detecting and the sharing.

3. The method of claim 1 further comprising:
   wherein the tuple includes a guest identifier and a page number, the guest identifier identifying the guest; and
   wherein the checksum entry item includes a different tuple that includes a different guest identifier, a different page number, and a different shared page identifier, the different guest identifier corresponding to the different guest.

4. The method of claim 1 further comprising:
   in response to determining that the data does not match the different data, removing the tuple from the checksum entry item.

5. The method of claim 1 further comprising:
   detecting an unsharing action by the guest; and
   in response to detecting the unsharing action, removing the tuple from the checksum entry item.

6. The method of claim 1 further comprising:
   in response to detecting that the memory page checksum does not match the checksum value included in the checksum entry item, creating a new checksum entry item, wherein the creating further comprises:
   including a new checksum value in the new checksum entry item, the new checksum value equaling the memory page checksum;
   including the tuple in the new checksum entry item, wherein the tuple includes a guest identifier, a page number, and the shared page indicator, the guest identifier identifying the guest and the page number identifying the page of memory.

7. An information handling system comprising:
   one or more processors;
   a memory accessible by at least one of the processors;
   a nonvolatile storage area accessible by at least one of the processors;
   a set of instructions stored in the memory and executed by at least one of the processors in order to perform actions of:
     receiving a memory page checksum from a guest, wherein the memory page checksum corresponds to a page of memory utilized by the guest;
     detecting that the memory page checksum matches a checksum value included in a checksum entry item, wherein the checksum entry item includes an identifier of a different guest; and
     in response to detecting that the memory page checksum matches the checksum value included the checksum entry item, sharing the page of memory between the guest and the different guest, wherein the sharing further comprises:
       adding a tuple to the checksum entry item that corresponds to the guest, wherein the tuple includes a shared page indicator that indicates the page of memory is not shared;
       determining that data in the page of memory matches different data in a different page of memory corresponding to the different guest;
       in response to determining that the data matches the different data, changing the shared page indicator to indicate the page of memory is shared; and
       executing a page sharing function that shares the page of memory between the guest and the different guest.

8. The information handling system of claim 7 wherein, prior to receiving the memory page checksum from the guest, the set of instructions performs actions of:
   loading the page of memory by the guest, wherein the guest is a guest operating system and the different guest is a different guest operating system;
   in response to loading the page of memory, computing, by the guest, the memory page checksum that corresponds to the loaded page of memory; and
   sending the memory page checksum to a hypervisor, wherein the hypervisor performs the detecting and the sharing.

9. The information handling system of claim 7 wherein the set of instructions performs actions of:
   wherein the tuple includes a guest identifier and a page number, the guest identifier identifying the guest; and
   wherein the checksum entry item includes a different tuple that includes a different guest identifier, a different page number, and a different shared page identifier, the different guest identifier corresponding to the different guest.

10. The information handling system of claim 7 wherein the set of instructions performs actions of:
  in response to determining that the data does not match the different data, removing the tuple from the checksum entry item.

11. The information handling system of claim 7 wherein the set of instructions performs actions of:
  detecting an unsharing action by the guest; and
  in response to detecting the unsharing action, removing the tuple from the checksum entry item.

12. A computer program product stored in a computer readable medium, comprising functional descriptive material that, when executed by an information handling system, causes the information handling system to perform actions that include:
  receiving a memory page checksum from a guest, wherein the memory page checksum corresponds to a page of memory utilized by the guest;
  detecting that the memory page checksum matches a checksum value included in a checksum entry item, wherein the checksum entry item includes an identifier of a different guest; and
  in response to detecting that the memory page checksum matches the checksum value included the checksum entry item, sharing the page of memory between the guest and the different guest, wherein the sharing further comprises:
    adding a tuple to the checksum entry item that corresponds to the guest, wherein the tuple includes a shared page indicator that indicates the page of memory is not shared;
    determining that data in the page of memory matches different data in a different page of memory corresponding to the different guest;
    in response to determining that the data matches the different data, changing the shared page indicator to indicate the page of memory is shared; and
    executing a page sharing function that shares the page of memory between the guest and the different guest.

13. The computer program product of claim 12 wherein, prior to receiving the memory page checksum from the guest, the information handling system further performs actions that include:
  loading the page of memory by the guest, wherein the guest is a guest operating system and the different guest is a different guest operating system;
  in response to loading the page of memory, computing, by the guest, the memory page checksum that corresponds to the loaded page of memory; and
  sending the memory page checksum to a hypervisor, wherein the hypervisor performs the detecting and the sharing.

14. The computer program product of claim 12 wherein the information handling system further performs actions that include:
  wherein the tuple includes a guest identifier and a page number, the guest identifier identifying the guest; and
  wherein the checksum entry item includes a different tuple that includes a different guest identifier, a different page number, and a different shared page identifier, the different guest identifier corresponding to the different guest.

15. The computer program product of claim 12 wherein the information handling system further performs actions that include:
  in response to determining that the data does not match the different data, removing the tuple from the checksum entry item.

16. The computer program product of claim 12 wherein the information handling system further performs actions that include:
  detecting an unsharing action by the guest; and
  in response to detecting the unsharing action, removing the tuple from the checksum entry item.

17. The computer program product of claim 12 wherein the information handling system further performs actions that include:
  in response to detecting that the memory page checksum does not match the checksum value included in the checksum entry item, creating a new checksum entry item, wherein the creating further comprises:
    including a new checksum value in the new checksum entry item, the new checksum value equaling the memory page checksum;
    including the tuple in the new checksum entry item, wherein the tuple includes a guest identifier, a page number, and the shared page indicator, the guest identifier identifying the guest and the page number identifying the page of memory.

* * * * *